Figure 3:
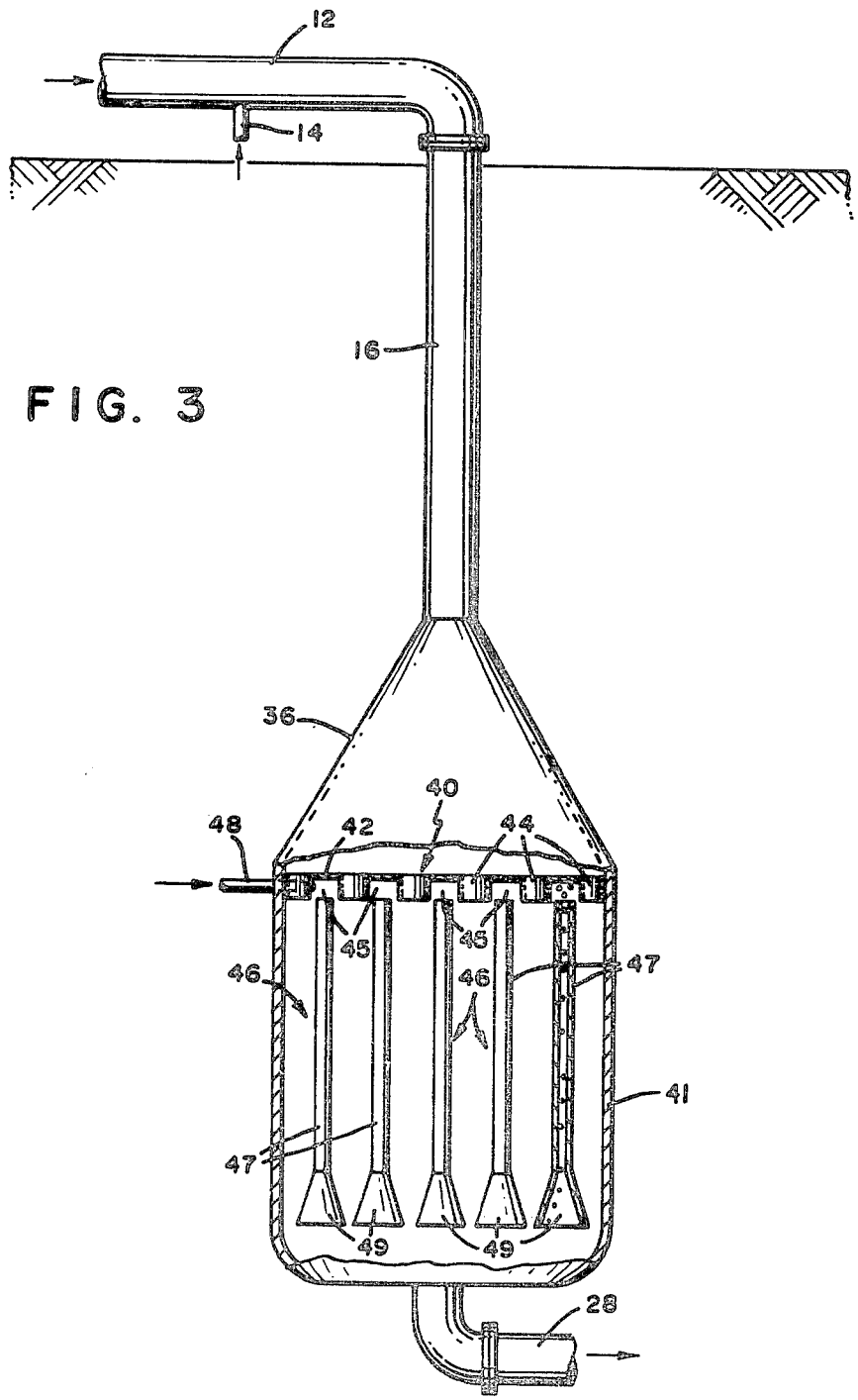

United States Patent [19]

Kos

[11] Patent Number: 4,477,393
[45] Date of Patent: Oct. 16, 1984

[54] APPARATUS FOR DISSOLUTION OF GASES IN LIQUID

[75] Inventor: Peter Kos, Ridgefield, Conn.

[73] Assignee: Dorr-Oliver Incorporated, Stamford, Conn.

[21] Appl. No.: 384,847

[22] Filed: Jun. 4, 1982

Related U.S. Application Data

[62] Division of Ser. No. 938,130, Aug. 30, 1978, abandoned.

[51] Int. Cl.³ .............................................. B01F 3/04
[52] U.S. Cl. ...................................... 261/76; 210/170; 210/221.2; 261/123; 261/DIG. 27; 261/DIG. 75
[58] Field of Search ................... 261/36 R, 76, 77, 93, 261/123, 126, DIG. 27, DIG. 75, DIG. 7; 210/170, 219, 220, 221.2, 620, 758; 435/313; 422/228; 209/170

[56] References Cited

U.S. PATENT DOCUMENTS

| | | | |
|---|---|---|---|
| 543,411 | 7/1895 | Taylor | 261/DIG. 75 |
| 2,633,344 | 3/1953 | Rekk | 261/76 |
| 3,761,065 | 9/1973 | Rich et al. | 261/76 |
| 3,993,448 | 11/1976 | Lowery, Sr. | 261/36 R X |
| 4,000,227 | 12/1976 | Garrett | 261/93 |
| 4,043,771 | 8/1977 | Anand | 261/77 |
| 4,060,574 | 11/1977 | Verner et al. | 261/123 X |
| 4,183,787 | 1/1980 | Roesler et al. | 261/77 X |

OTHER PUBLICATIONS

ICI, "The ICI Deep Shaft Effluent Treatment Process", ICI Limited, Cleveland, Sep., 1965.

*Primary Examiner*—Richard L. Chiesa
*Attorney, Agent, or Firm*—Harold M. Snyder; Burtsell J. Kearns

[57] ABSTRACT

A treatment system for liquids includes apparatus for dissolving gas in the liquid and a container for providing the necessary reaction time between the gas and the liquid or constituents thereof. The device for dissolving the gas in the liquid includes gas injection means for introducing gas into the liquid and a contact chamber for containing a downflowing stream of the liquid to be treated. The pressure within the downflowing stream increases as it descends and at the elevated pressure the capacity of the liquid to take gas into solution is greatly increased. This apparatus for dissolving gas may conveniently be located below ground level. A conduit return means is provided for routing undissolved gas from a region at high pressure to an upstream portion of the liquid stream so that the gas can be reintroduced for dissolution.

5 Claims, 7 Drawing Figures

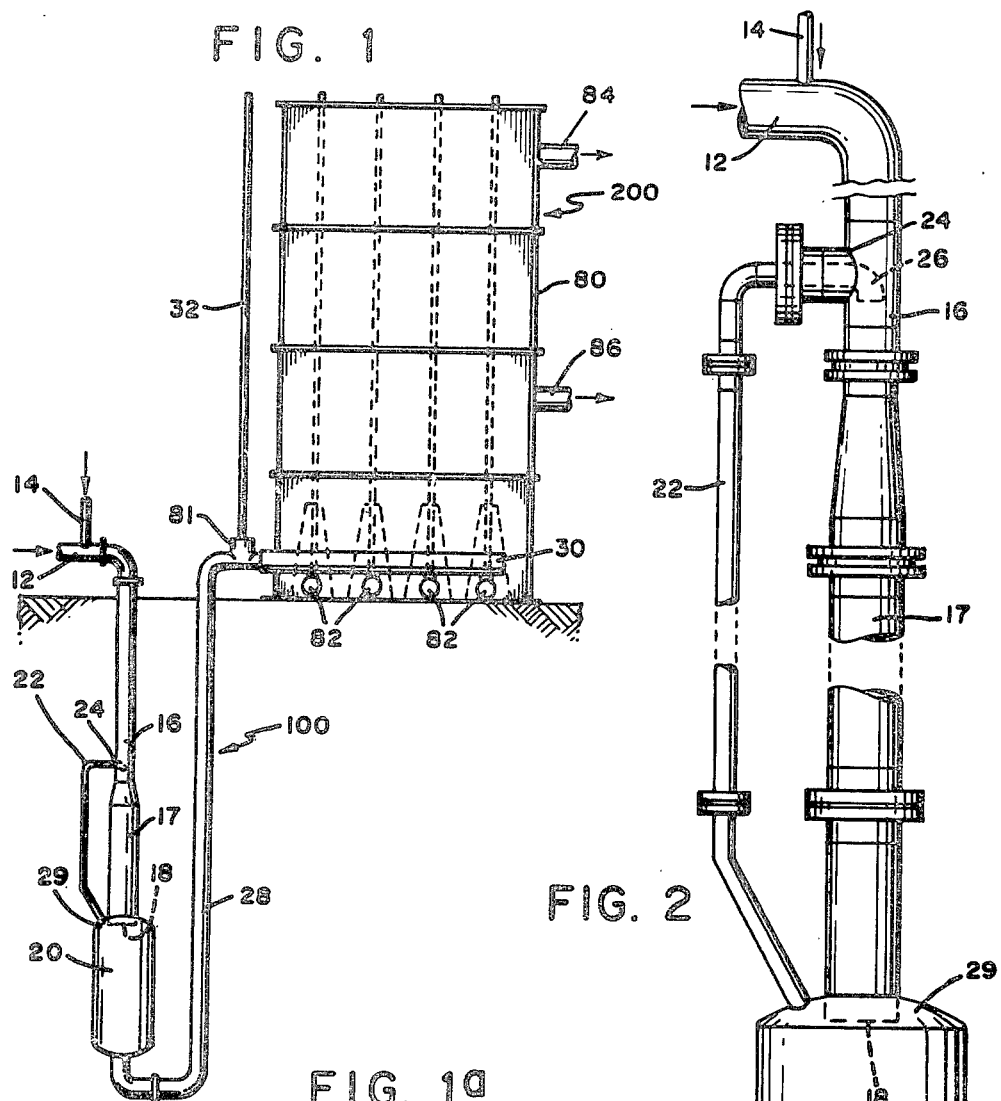
FIG. 1
FIG. 2
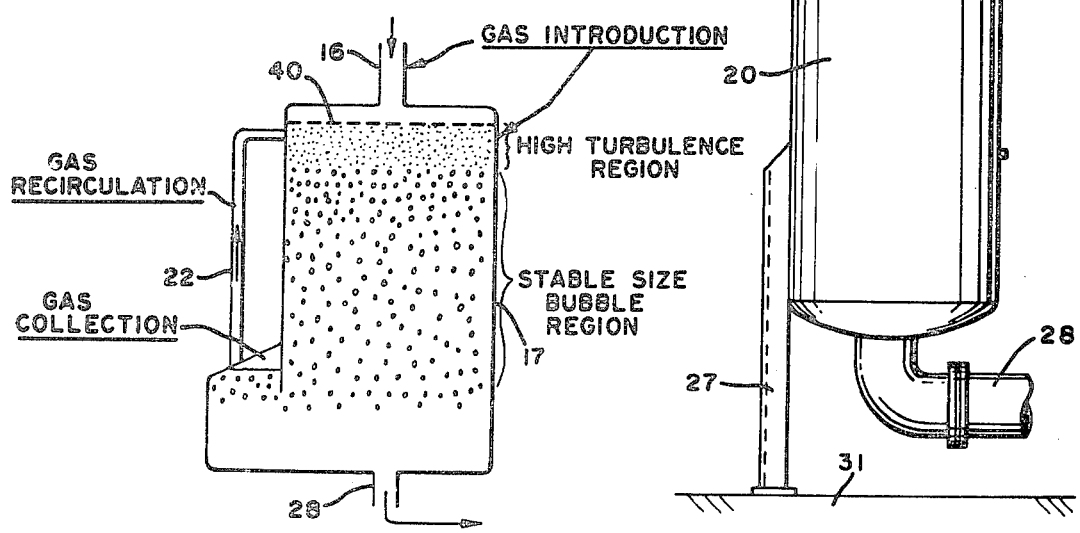
FIG. 1a
GAS INTRODUCTION
HIGH TURBULENCE REGION
GAS RECIRCULATION
STABLE SIZE BUBBLE REGION
GAS COLLECTION

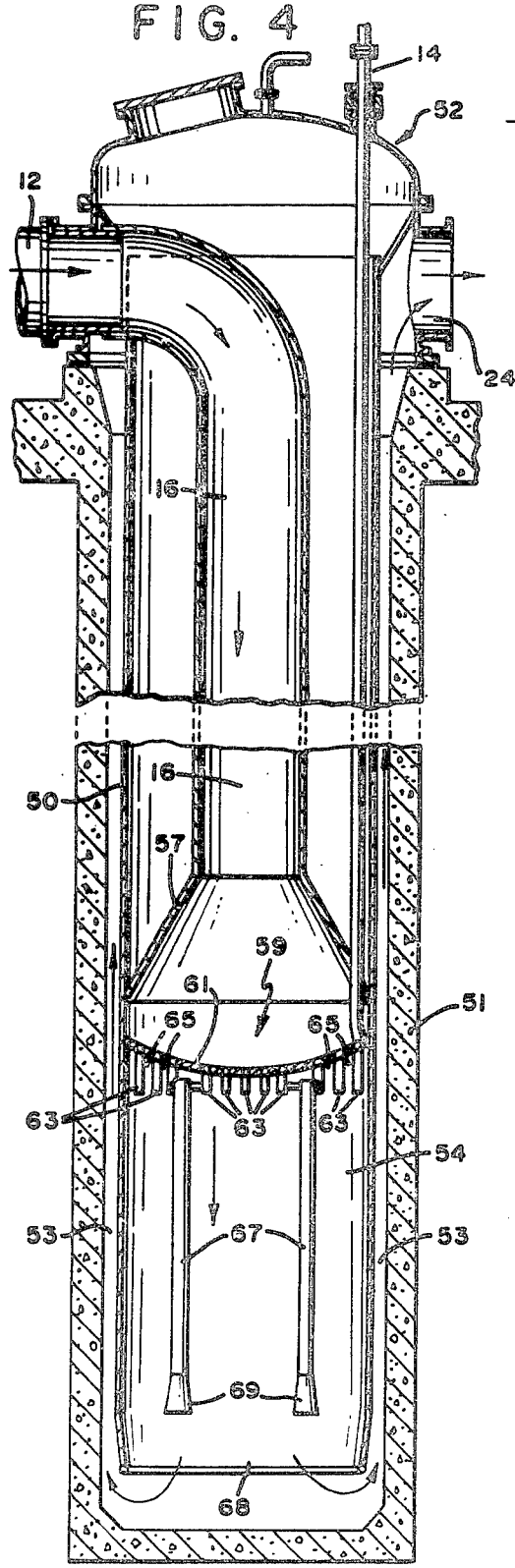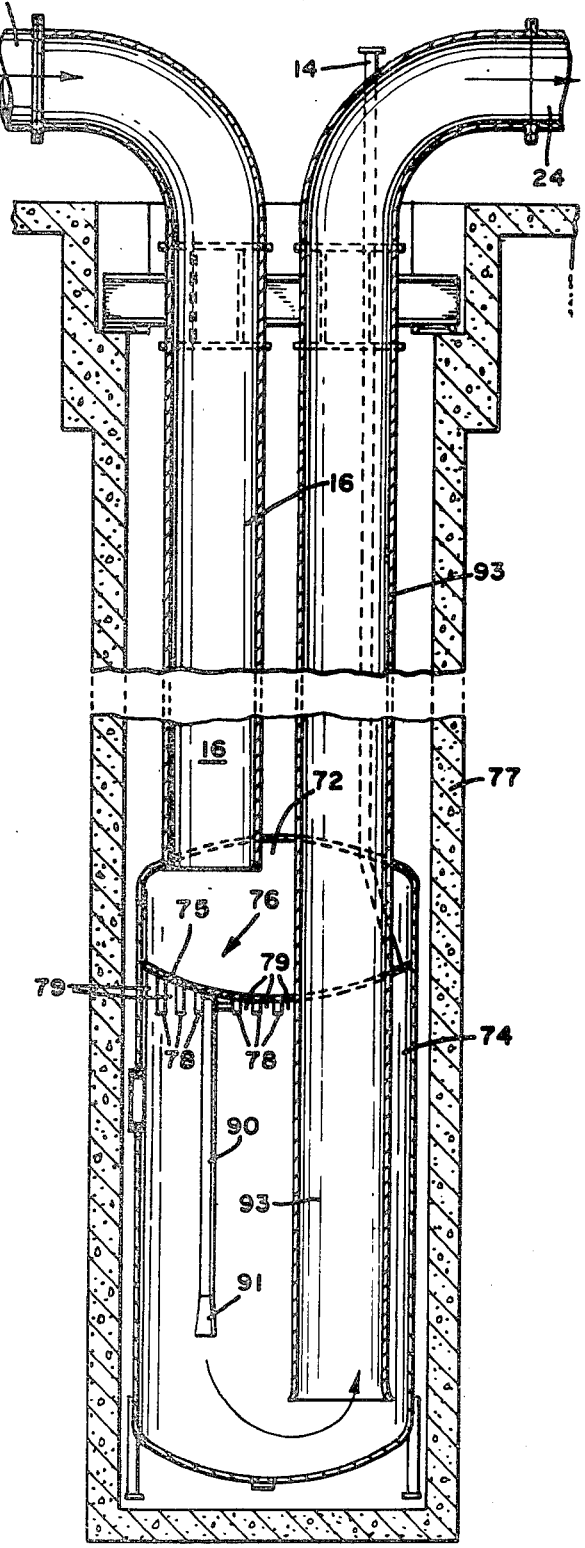

APPARATUS FOR DISSOLUTION OF GASES IN LIQUID

This is a division of application Ser. No. 938,130, filed Aug. 30, 1978, and now abandoned.

This invention is directed to a system for dissolving gas in liquid wherein the gas may be oxygen-containing and the liquid may have an oxygen demand.

In many processes it is desirable to dissolve gases in liquids. Such processes include the dissolution of carbon dioxide in water in the carbonation of water, the dissolution of oxygen in water in water treatment technology or in waste water treatment and in certain fermentation processes. Very often the system for dissolving gas in liquid involves very severe agitation of the liquid-gas mixture to break up the gas bubbles into very fine bubbles which present a large surface area to the liquid, thereby promoting solution of gas in the liquid. Alternatively, the liquid may be sprayed in fine droplets through the gas so that, with the large surface area presented by the droplets, substantial amounts of gas are dissolved in the liquid. Oxygenation of water has been accomplished in several ways including spray aeration, in which water is sprayed into the air in fine droplets and the fine droplets dissolve oxygen as they pass through the air; cascade aeration, in which a water stream is arranged so that a series of falls are provided in a conduit, each fall increasing exposure of the water to the air; multi-tray aeration, in which the water drops onto a series of trays picking up oxygen during its fall to the trays; diffused aeration in which air under pressure is bubbled through a volume of water in which the air bubbles have extended exposure to the water for solution purposes; and lastly, U-tube aeration in which an air-water mixture is passed down under a baffle which may extend 50 feet or more below the surface of the ground to pressurize the mixture and then returning the mixture to the surface.

Where oxygen is to be dissolved in water it is clear that the use of pure oxygen rather than air will permit either a reduction in size of various elements of the apparatus used in the process or, alternatively, a great increase in the productivity of units sized for the use of air, since air is only 1/5 oxygen. However, in contrast to air, pure oxygen is quite expensive and care must be taken to avoid wastage of the oxygen gas.

A novel structure has now been provided in which large amounts of gas may be rapidly dissolved in liquids.

It is the object of this invention to provide a relatively simple but highly efficient apparatus for dissolving gas in liquid.

Figure 6:
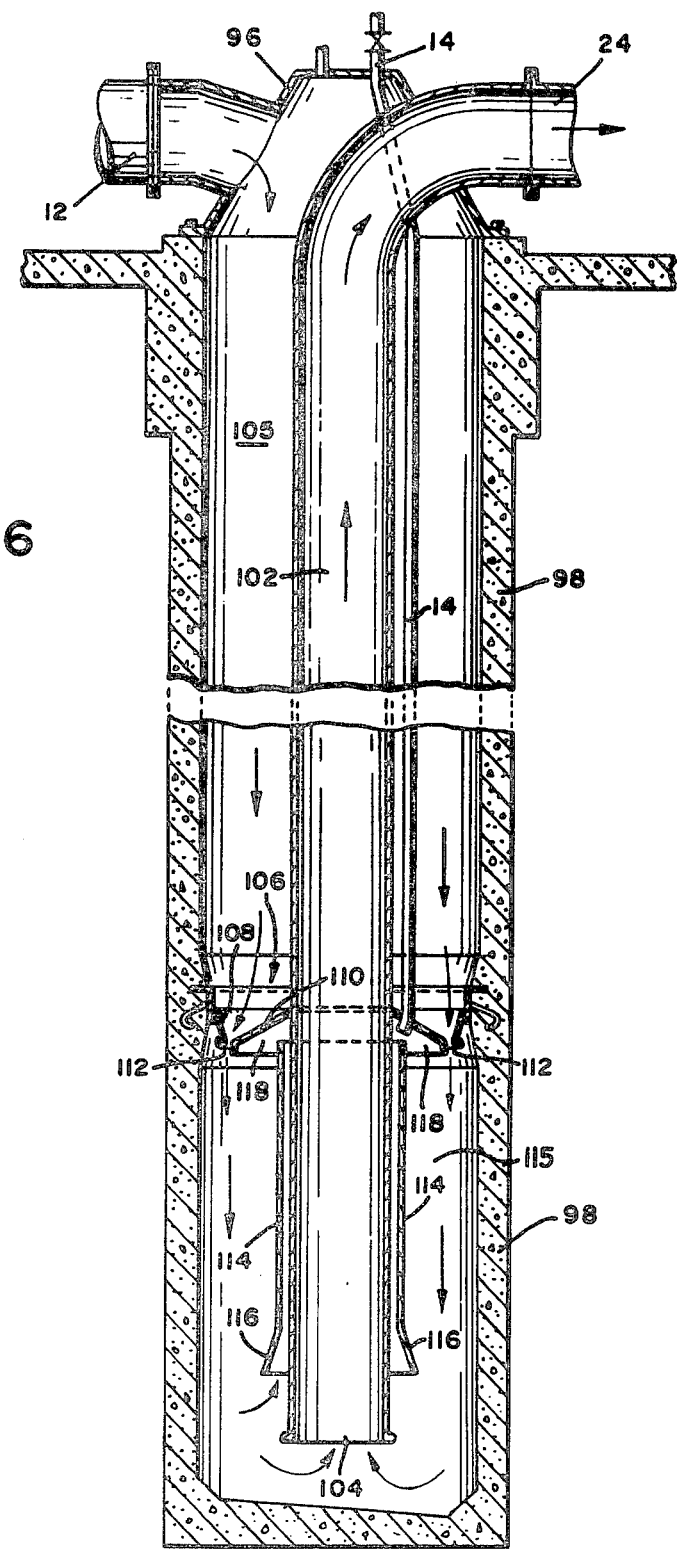

Other objects and advantages will become apparent from the following description taken in conjunction with the accompanying drawing in which:

FIG. 1 is a view in elevation of a treatment system which includes a fluid bed reactor and an apparatus for dissolving gas in liquid, FIG. 1a is a schematic view of an apparatus illustrative of certain of the principal features of the invention, FIG. 2 is a view in elevation showing the apparatus for dissolving gas in liquid in larger scale, FIG. 3 is a view in elevation and partially in section of a modified form of the apparatus for dissolving gas in liquid, FIG. 4 is a view partially in section of a pit-installed modified form of apparatus for dissolving gas in liquid, FIG. 5 is a view, partially in section, of a self-contained apparatus for dissolving gas in liquid in a below-ground installation and FIG. 6 is a further modified form of the apparatus for dissolving gas in liquid as installed in a pit.

Generally speaking, the apparatus for continuously dissolving gas in liquid in accordance with this invention involves a means for bringing the gas into contact with a stream of liquid, means for pressurizing the liquid while in contact with the gas to the pressure necessary to dissolve the required amount of gas, means for collecting undissolved gas in the pressurized zone and means for returning the collected gas to an upstream portion of the liquid stream for reintroduction of the gas into the liquid. The gas which is to be dissolved in the liquid is quite often oxygen, in which case the apparatus for dissolving gas in liquid may be termed an "oxygenator", and the liquid may be the effluent from the primary treatment stage of a sewage plant or other liquid flow.

In order to obtain the desired pressure, it is often quite convenient to install the oxygenator below ground level at a depth such that the hydrostatic pressure of the column of liquid is sufficient to provide the desired pressure for gas dissolution. The oxygenator may be a self-contained unit which is simply lowered into an excavated pit to the desired depth with no particular significance attached to whether or not the pit is water tight or, the apparatus may be designed to utilize the pit wall to contain either the inlet or the outlet flow, in which case the pit wall must be water tight.

As an illustration of certain of the principles involved in the present invention, reference is made to FIG. 1a, in which an apparatus comprising a contact chamber 17 having an inlet pipe 16 and an outlet pipe 28, is provided with a flow distributor 40 and a gas recycle line 22.

Liquid enters into the contact chamber 17 through the inlet 16 and the flow distributor 40. Gas is introduced into the contact chamber 17, preferably below the distributor 40, or into the liquid stream above the distributor. The purpose of the distributor is threefold: (a) to distribute the incoming liquid uniformly through the whole horizontal cross section of the contact chamber, (b) to introduce liquid with velocity sufficient to break larger gas bubbles into smaller ones, and (c) to introduce liquid into the contact chamber with velocity greater than the rising velocity of gas bubbles in the chamber in order to prevent gas escaping from the contact chamber into the inlet pipe.

It has been determined that, in case of oxygen dissolution in water, the entrance velocity of the liquid may be in the range from 1 to 10 ft./sec.

Any large gas bubbles present under the distributor as a result of gas feeding or gas recirculation are sheared by the entering liquid into smaller ones, and the small bubbles are swept downward by the stream of liquid. The size of these bubbles is determined by the balance between surface-tension forces and liquid stress (turbulence). The greater the velocity of the incoming liquid the greater the turbulence below the distributor and smaller the size of the bubbles. The bubbles swept away from the distributor (into the region not affected by the turbulence of the incoming liquid) tend to coalesce as they touch each other until they reach the maximum stable size for the prevailing shear field in the contact chamber. When relatively low entrance velocities are used (1–5 ft./sec.), the turbulent region does not extend beyond more than about two feet below the distributor.

Outside the turbulent region, below the distributor, bubbles of uniform size predominate; that is, bubbles of maximum stable size. The turbulent region and the region of stable bubble size are indicated by appropriate legends in FIG. 1a.

The downward velocity of the liquid in the contact chamber must be greater than the rising velocity of the maximum stable sized bubbles, thus causing a continuous downward flow of bubbles carried by the liquid. For the oxygen-water system the minimum downward velocity is found to be approximately ½ ft./sec. When the difference between the downward velocity of liquid and rising velocity of stable bubbles is small, then a relatively high concentration of bubbles in the contact chamber is obtained and bubbles remain for a longer time in the contact chamber before they are swept down to the lower end of the contact chamber. It is well known that the rate of the dissolution is directly proportional to the interfacial area (area of the bubble surface), thus the greater the concentration of bubbles the greater the rate of the dissolution.

In order to further increase the concentration of bubbles in the contact chamber (and so further increase the rate of dissolution) and to attain high utilization of the gas, the bubbles which reach the bottom portion of the contact chamber are collected in a bubble collector and recirculated to the top of the contact chamber. The bubble collector may comprise a horizontal or inclined surface for intercepting and retaining rising bubbles, but other gas-liquid separation means may be used. The collected gas then flows through the gas recirculation pipe conduit 22 and discharges under the distributor 40. This gas recirculation does not require any external pumping. Gas flows by itself due to the difference in the densities of the gas-liquid mixture in the contact chamber and in the recycle pipe. Nevertheless, the forced recirculation of gases (by pump or by venturi) could be beneficial in some applications.

In the apparatus just described, a very high gas utilization, approaching 100%, can be achieved and the high rate of dissolution permits the use of equipment of modest size. These advantages are due to the special hydraulic conditions established at the top of the contact chamber, in the chamber itself and by gas recirculation whereby a very large gas-liquid interfacial area is realized by establishing a high concentration of stable size bubbles. An energy saving is effected by relying primarily on the high concentration of stable size bubbles for dissolution of the gas rather than expending large amounts of energy to generate extremely small, unstable bubbles for the gas dissolution process.

Considering FIG. 1, there is illustrated a liquid-treatment system comprising an apparatus 100 for dissolving gas in liquid which delivers liquid containing large amounts of dissolved gas to a reactor 200. The reactor 200 illustrated is a fluid bed reactor in which the oxygen enriched waste water is introduced at the bottom thereof and the liquid passes through the reactor, the retention time of the liquid in the reactor being such as to obtain the desired degree of reaction. For the purposes of this discussion, we may consider the system illustrated in FIG. 1 a biological treatment system for waste water, wherein the apparatus for dissolving gas in liquid is an oxygenator and the fluid bed reactor contains a sand bed therein on the particles of which biological growth proceeds supported by the nutrients in the feed and the dissolved oxygen provided by the oxygenator.

The feed to the system enters through inlet pipe 12 while pure oxygen is introduced through conduit 14. The waste water-oxygen mixture proceeds below ground level through downcomer 16 then enters contact chamber 17 and emerges from outlet 18 into the bubble collector 20. A return oxygen conduit 22 connects the upper end of the bubble collector 20, where the gas is trapped, with the contact chamber 17 at an upstream junction 24. An outlet conduit 28 connects the lower end of bubble collector 20 with the manifold 30 of the fluid bed reactor 200. The manifold 30 may be provided with a bubble collector 81 and a vent pipe 32 which will either release to the atmosphere or to a gas collection tank any undissolved oxygen which reaches the manifold. The structure and operation of the fluid bed reactor is described in detail in my copending U.S. application Ser. No. 909,076, filed May 24, 1978, now U.S. Pat. No. 4,202,744. Briefly, it should be noted that the oxygen-containing liquid is supplied from the manifold 30 to a plurality of inlet pipes 82 which admit the waste water into the reactor tank 80 and that the treated effluent exits the reactor tank through conduit 84. A sand bed is provided in the reactor tank 80 which is fluidized by the upflowing liquid stream and on the particles of which biological growth occurs. A portion of the sand is removed continuously or batchwise through conduit 86 for removal of biological growth from the sand and disposal thereof after which the sand can be returned to the tank 80.

The gas dissolution feature of this invention relies in large part on the phenomenon that as the pressure is increased on a gas-liquid mixture the amount of gas that goes into solution is increased. The pressure on a gas-liquid mixture may be increased, for example, by pumping the mixture into the gas-liquid contact device while regulating the pressure therein by adjustment of a choke valve located at the exit from the device. In the present invention, it is preferred to obtain the required pressure by providing a contact chamber which is subject to a column of water of height sufficient to develop the necessary hydrostatic pressure. A simple way to accomplish this end is to provide, in a pit excavated to the depth necessary to develop the pressure, a conduit filled with the liquid extending from an above ground level down to a contact chamber. In this manner, a column of say, 60 feet of water, will generate a pressure of about 40.7 lbs. per sq. in. (absolute), a pressure at which water, at ambient temperature, can dissolve several times the amount of oxygen it is capable of dissolving at atmospheric pressure. In the contact chamber, a great amount of oxygen goes into solution, and a high concentration of stable size bubbles is present.

An outlet conduit is provided connected to the bubble collector for returning treated liquid to ground level. Since the liquid is saturated, or very nearly saturated, with gas as it moves from the bubble collector to ground level, and since the pressure on the liquid as it rises is continuously decreasing, a certain amount of the gas can be expected to come out of solution. For that reason, the vent line 32, connected to bubble collector 81, is provided at ground level in the outlet pipe 28 so that operation of the fluid bed reactor 200 is not adversely affected by the introduction of larger bubbles.

It should be noted that the pressurization is accomplished, as described above, without expenditure of large amounts of energy. This is true because the below ground portion of the apparatus is filled with liquid by gravity and only power sufficient to overcome the flow resistance of the apparatus and maintain the desired flow rate is required.

FIG. 2 illustrates the gas dissolving apparatus or oxygenator of FIG. 1 in somewhat greater detail at larger scale. In this rendition of the apparatus it should be noted that the end 18 of the downcomer 16 projects into the bubble collector 20 to a substantial extent. This projection of the end 18 into the bubble collector 20 leaves a gas trap 29 above the end 18 of the downcomer 16 and below the top of the bubble collector 20. The recycle line 22 provides communication between the gas trap 29 and the nozzle 26 located at the upstream junction 24 in the downcomer 16. The nozzle 26 cooperates with the wall of conduit 16 to form a narrowed annular passage or distributor for the liquid moving in conduit 16. This narrowed channel imparts a high velocity to the liquid which will prevent upward movement of gas bubbles and tends to uniformly distribute the gas-liquid mixture on the cross-section of conduit 16 below nozzle 26. An outlet conduit 28 is connected to the bottom of bubble collector 20. The apparatus 100 is supported by at least one bracket 27 fixed to a surface 31 and connected to the exterior of bubble collector 20.

In FIG. 3 an apparatus is shown which is similar in concept to that described in FIG. 2 but intended for use where larger flows must be accomodated. Thus, the inlet conduit 12 is connected to the downcomer 16. The downcomer 16 is connected to a conical transition section 36 which, in turn, connects with the contact chamber 41. The transition section 36 flares outwardly from the relatively small diameter of the downcomer 16 to the larger diameter of the contact chamber 41. The contact chamber 41, has, at the upper end thereof, distributor 40, and includes a bubble collection structure. The distributor 40 comprises a flat plate 42 pierced by a plurality of stub tubes 44. The space between the lower ends of downwardly depending stub tubes 44 and the underside of plate 42 forms an oxygen trap 45. A plurality of oxygen collecting and recycle lines 46 are provided within contact chamber 41, which comprise tubes 47 with the lower ends thereof having flared portions 49. The oxygen trap 45 and the oxygen collecting and recycle lines 46 comprise the bubble collection structure. An outlet 28 is provided at the bottom of contact chamber 41. Oxygen may be introduced into the feed through line 14 which is connected to the inlet 12 or, aternatively, oxygen may be directly introduced into the oxygen trap 45 through the conduit 48.

In operation, the flow through the downcomer 16 and transition section 36 is distributed relatively uniformly over the whole cross-section of the contact chamber 41 by the distributor 40. Bubbles of oxygen which survive travel to the bottom of the contact chamber 41 enter the flared bottom portions 49 of the recycle lines 46 and the gas is returned upstream to the gas trap 45. The liquid moving through the distributor 40 draws the oxygen from the gas trap 45 thus mixing the gas with the liquid again and thereby exposing the gas once more to the solution process.

The oxygenation apparatus described above have been self-contained, that is, the devices are simply lowered into a pit of suitable depth and all circulation of liquid and gases occurs within the apparatus. In FIG. 4 an apparatus is illustrated which utilizes the wall of the pit to contain one stream of the circulating liquid. In this embodiment a shell 50 is lowered into the watertight concrete pit 51 and the sealing cap 52 thereof is secured (by means not shown) to the edge of the pit to form a watertight seal. The downcomer 16 is centrally located within shell 50 and is connected to the inlet 12 through which the feed is introduced at ground level and to the transition conduit 57 at its lower end. When shell 50 is in place it is spaced generally uniformly from the concrete pit wall 51 so that an annular space 53 surrounding the shell 50 is available to serve as an outlet conduit. Adjacent the bottom end of the transition conduit 51 is located the distributor 59 which extends across the interior cross-section of the shell 50. This distributor comprises a plate 61 which is concave upwardly, i.e., facing the direction of flow, to better resist the force exerted by the flowing liquid and has a plurality of stub tubes 63 therein for passing the liquid into the lower section of the shell which constitutes the contact chamber 54. A plurality of recycle tubes 67 similar to those illustrated in FIG. 3 are provided in the chamber below the distributor 59 for returning oxygen to the oxygen trap 65 on the convex surface of the plate 61. The fluid within the shell 50, after traversing the contact chamber 54 below distributor 59 and having been separated from most of the undissolved oxygen, leaves shell 50 through the bottom opening 68 and turns upwardly to rise along waterproof pit wall 51 in the annular channel 53. Upon reaching ground level, the oxygen-treated liquid exits through outlet 24. Oxygen is introduced into the system through oxygen conduit 14 which extends downwardly from the top of the unit to and through the plate 61 and the oxygen is delivered into the oxygen trap 65 on the downstream side of plate 61. Again, from oxygen trap 65, the oxygen is drawn into the liquid flow issuing from the stub tubes 63.

The embodiment of FIG. 5 has elements in common with the embodiments of both FIGS. 3 and 4. Thus, it is a self-contained unit as is the embodiment of FIG. 3, located in pit 77, with a distributor similar to that of the embodiment of FIG. 4. In this case, the influent which enters through inlet 12 is conducted by the downcomer 16 for discharge into the upper compartment 72 of the contact chamber 74. The liquid traverses the distributor 76 through stub tubes 78 and picks up the oxygen supplied to the oxygen trap 79 through the oxygen line 14. In the contact chamber 74, the oxygen collecting and recycle lines 90, with their flared ends 91, operate in a manner exactly similar to the corresponding elements in the embodiments of FIGS. 3 and 4. An upflow pipe 93 is positioned within the contact chamber 74 with its open end below the lower end of oxygen recycle tubes 90 and it extends upwardly through the distributor 76 and the top end wall of the contact chamber 74 to ground level where it is connected to the outlet pipe 24. Since the apparatus is self-contained, the wall of the pit 77 need not be watertight.

The embodiment of FIG. 6 utilizes the wall of a watertight pit as a part of the conduit conducting the inflowing liquid. An inlet 12 is connected to a ground level sealing cap 96 which is sealed to the upper edge of the concrete lined pit 98. Centrally located within the pit wall 98 is an upflow pipe 102 with the lower open end 104 thereof adjacent the bottom of pit 98 and the upper end thereof passing through the sealing cap 96 to join with the outlet conduit 24. A distributor 106 is located in the annular downflow path 105 between the wall 98 and the upflow pipe 102 and defines the upper end of the contact chamber 115. This distributor 106 is composed of a first annular element 108 which is embedded in and secured to the wall 98 and extends inwardly from the wall 98 to narrow the downflow conduit 105. A second annular element 110 is secured about the outlet pipe 102 and extends radially outward from the pipe 102 so that the outer edge thereof is located close to but spaced from said first annular member 108. With this arrangement, a relatively narrow annular opening 112 is provided between the two elements of the distributor 106. The annular element 110 depends from the upflow tube 102 in a downward direction to its closest point of approach to the annular element 108. A recycle skirt 114 surrounds, but is spaced from, the upflow tube 102 and extends from the bottom of upflow tube 102 to a point at the level of the distributor 106. At the lower extremity of the skirt 114, a flared portion 116 is provided which extends away from the upflow tube 102. The upper extremity of the skirt 114 extends into the volume defined by and beneath the depending annular element 110 and the adjacent upflow tube 102, which volume constitutes an oxygen trap 118. Pure oxygen is admitted into the system through line 14 which extends through the sealing cap 96, the downflow conduit 105, and passes through the annular element 110 to discharge into the oxygen trap 118. The bubbles in the downflowing liquid in contact chamber 115 below the distributor 106 tend to rise into the flared portion 116 of the skirt 114 and so oxygen is recycled into the oxygen trap 118.

It is envisioned that the inventive processes and apparatus set forth herein may also be applied to the dissolution of other gases in liquid streams other than waste or other streams which have an oxygen deficiency or otherwise require treatment with oxygen.

While the present invention has been particularly described in terms of specific embodiments thereof, it will be understood in view of the instant disclosure that numerous variations upon the invention will now be evident to those skilled in the art, which variations are yet within the scope of the instant teaching.

I claim:

1. Apparatus for dissolving gas in a liquid comprising, an inlet for introducing a liquid stream into said apparatus, means for injecting a gas into said liquid stream to produce a mixed gas-liquid stream, a contact chamber arranged to receive said mixed gas-liquid stream for vertically downward flow therethrough, and a connecting vertical downcomer disposed intermediate said inlet and said contact chamber so that, when filled with the inflowing liquid, the hydrostatic head thereof develops at least part of the pressure required in said contact chamber, a flow distributor at the upper end of said contact chamber to assure that a uniform velocity of flow is achieved as measured along a cross-section of said liquid stream in said chamber, said flow distributor comprising a perforated plate having a plurality of stub tubes fixed in the plate perforations and extending from said plate in a downstream direction, said contact chamber being of essentially uniform cross-section so that a substantially constant velocity of said mixed gas-liquid stream may be maintained therein, gas bubble collecting means located adjacent the lower end of said contact chamber to collect undissolved gas present in said mixed gas-liquid stream after it traverses said contact chamber, gas recycle means connecting said gas bubble collecting means to an upstream location in said liquid stream so that said gas is reinjected into said liquid stream, said perforated plate and the stub tubes thereof comprising a gas trap at said upstream location into which said gas recycle means discharges gas collected by said gas bubble collecting means, and an outlet to permit the treated liquid stream to exit said apparatus, said contact chamber being installed in a pit below ground level to utilize the hydrostatic pressure developed thereby in achieving said elevated pressure and said pit being water-tight so that the wall of said pit can serve as a conduit conducting liquid flow to or from said contact chamber.

2. Apparatus for dissolving gas in a liquid comprising, an inlet for introducing a liquid stream into said apparatus, means for injecting a gas into said liquid stream to produce a mixed gas-liquid stream, a contact chamber arranged to receive said mixed gas-liquid stream for vertically downward flow therethrough, and a connecting vertical downcomer disposed intermediate said inlet and said contact chamber so that, when filled with the inflowing liquid, the hydrostatic head thereof develops at least part of the pressure required in said contact chamber, means for maintaining said contact chamber at an elevated pressure, said contact chamber having a diameter greater than said liqid stream in said inlet to slow said liquid stream and thereby promote dissolution of said gas, a flow distributor at the upper end of said contact chamber to assure that a uniform velocity of flow is achieved as measured along a cross-section of said liquid stream in said chamber, said flow distributor comprising a perforated plate which is curved to resist the force exerted by the liquid stream with stub tubes fixed in the plate perforations and extending from said plate in a downstream direction, said contact chamber being of essentially uniform cross-section so that a substantially constant velocity of said mixed gas-liquid stream may be maintained therein, gas bubble collecting means located adjacent the lower end of said contact chamber to collect undissolved gas present in said mixed gas-liquid stream after it traverses said contact chamber, gas recycle means connecting said gas bubble collecting means to an upstream location in said liquid stream so that said gas is reinjected into said liquid stream, an outlet to permit the treated liquid stream to exit said apparatus, said gas recycle means comprising a plurality of tubes extending from said gas bubble collecting means to an upstream location proximate said flow distributor and said bubble collecting means comprising flared terminal sections of said tubes in the lower portion of said pressure chamber with the space between the upstream ends of said tubes and said perforated plate comprising a gas trap into which said tubes discharge gas collected by said gas bubble collecting means, said gas injection means being connected to introduce gas directly into said gas trap or into the liquid stream in said inlet.

3. Apparatus for dissolving gas in a liquid comprising, an inlet for introducing a liquid stream into said apparatus, means for injecting a gas into said liquid stream to produce a mixed gas-liquid stream, a contact chamber arranged to receive said mixed gas-liquid stream for vertically downward flow therethrough, means for maintaining said contact chamber at an elevated pressure, a flow distributor positioned between said downcomer and said contact chamber to assure that a uniform velocity of flow is achieved as measured along a cross-section of said liquid stream in said chamber, said flow distributor comprising a first annular element secured to and extending inward from the wall of said pit and a second annular element secured to and depending outwardly from said product pipe, the inner periphery of said first annular element being close to but not in contact with the outer periphery of said second annular element thereby providing an annular flow path between said annular elments, said contact chamber being of essentially uniform cross-section so that a substantially constant velocity of said mixed gas-liquid stream may be maintained therein, gas bubble collecting means located adjacent the lower end of said contact chamber to collect undissolved gas present in said mixed gas-liquid stream after it traverses said contact chamber, gas recycle means connecting said gas bubble collecting means to an upstream location in said liquid stream so that said gas is reinjected into said liquid stream, an outlet to permit the treated liquid stream to exit said apparatus, a downcomer connecting said inlet to said contact chamber for conveying said liquid stream from said inlet to said chamber, said chamber being located below ground level in a water-tight pit, the wall of said pit serving as the wall of said downcomer and said chamber, and a product pipe centrally positioned in said pit extending well below ground level, the open end of said product pipe in said chamber being proximate the bottom of said pit with the other end of said pipe connected to said outlet.

4. The apparatus of claim 3 wherein said gas recycle means comprises a tubular member in said contact chamber surrounding but spaced from said product pipe and extending from said flow distributor to a location approaching said open end of said product pipe, and said gas bubble collecting means comprises the lower segment of said tubular member, said lower segment being flared away from said product pipe to facilitate collection of gas bubbles.

5. The apparatus of claim 4 wherein said depending second annular element provides a gas trap on the downstream side thereof adjacent said annular flow path into which said gas recycle means discharges and said gas injection means is arranged to inject gas directly into said gas trap.

* * * * *